| (12) | United States Patent | (10) Patent No.: US 10,244,255 B2 |
|---|---|---|
| | Jacobson et al. | (45) Date of Patent: Mar. 26, 2019 |

(54) RATE-CONSTRAINED FALLBACK MODE FOR DISPLAY STREAM COMPRESSION

(71) Applicant: QUALCOMM Incorporated, San Diego, CA (US)

(72) Inventors: Natan Haim Jacobson, San Diego, CA (US); Vijayaraghavan Thirumalai, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 15/078,792

(22) Filed: Mar. 23, 2016

(65) Prior Publication Data

US 2016/0301950 A1 Oct. 13, 2016

Related U.S. Application Data

(60) Provisional application No. 62/146,911, filed on Apr. 13, 2015.

(51) Int. Cl.
*H04N 19/593* (2014.01)
*H04N 19/147* (2014.01)
(Continued)

(52) U.S. Cl.
CPC .......... *H04N 19/593* (2014.11); *G09G 5/006* (2013.01); *G09G 5/026* (2013.01); *H04N 19/11* (2014.11);
(Continued)

(58) Field of Classification Search
CPC .......... G09G 2340/02; G09G 2340/06; G09G 2360/127; G09G 5/026; H04N 19/11;
(Continued)

(56) References Cited

U.S. PATENT DOCUMENTS

| 4,922,273 A | 5/1990 | Yonekawa et al. |
| 5,398,078 A | 3/1995 | Masuda et al. |

(Continued)

FOREIGN PATENT DOCUMENTS

| EP | 2348734 A1 | 7/2011 |
| JP | H05130433 A | 5/1993 |

(Continued)

OTHER PUBLICATIONS

Richardson; The H.264 Advanced Video Compression Standard; Wiley; 2010; 2nd Edition; pp. 1-349 (Chapter 3-9) (Year: 2010).*

(Continued)

*Primary Examiner* — Peter D Le
(74) *Attorney, Agent, or Firm* — Shumaker & Sieffert, P.A.

(57) ABSTRACT

A method and apparatus for coding video information are disclosed. In one example, the method may involve: identifying one or more prediction modes for a fixed-rate codec, each prediction mode having a rate-distortion cost; and selecting, for a current block, a prediction mode that has the lowest rate-distortion cost from among the one more prediction modes not previously selected. The method may involve: (i) determining whether the selected prediction mode would result in overflow or underflow of a buffer of the fixed-rate codec; and (ii) determining whether the selected prediction mode would result in remaining bits in the slice being insufficient to code remaining blocks of the slice. The method may involve utilizing a fallback mode to code the current block in response to each of the selected one or more prediction modes resulting in at least one of conditions (i) and (ii) being true.

30 Claims, 7 Drawing Sheets

(51) Int. Cl.
| | |
|---|---|
| H04N 19/174 | (2014.01) |
| H04N 19/11 | (2014.01) |
| H04N 19/186 | (2014.01) |
| H04N 19/124 | (2014.01) |
| H04N 19/625 | (2014.01) |
| H04N 19/61 | (2014.01) |
| H04N 19/423 | (2014.01) |
| H04N 19/112 | (2014.01) |
| H04N 19/159 | (2014.01) |
| H04N 19/15 | (2014.01) |
| G09G 5/02 | (2006.01) |
| G09G 5/00 | (2006.01) |

(52) U.S. Cl.
CPC ......... *H04N 19/112* (2014.11); *H04N 19/124* (2014.11); *H04N 19/147* (2014.11); *H04N 19/15* (2014.11); *H04N 19/159* (2014.11); *H04N 19/174* (2014.11); *H04N 19/186* (2014.11); *H04N 19/423* (2014.11); *H04N 19/61* (2014.11); *H04N 19/625* (2014.11); *G09G 2340/02* (2013.01); *G09G 2340/06* (2013.01); *G09G 2360/127* (2013.01)

(58) Field of Classification Search
CPC .. H04N 19/112; H04N 19/124; H04N 19/147; H04N 19/15; H04N 19/159; H04N 19/174; H04N 19/186; H04N 19/423; H04N 19/593; H04N 19/61; H04N 19/625

See application file for complete search history.

(56) References Cited

U.S. PATENT DOCUMENTS

| | | | |
|---|---|---|---|
| 5,933,451 A | 8/1999 | Ozkan et al. | |
| 7,039,108 B2 | 5/2006 | Bauer et al. | |
| 8,363,717 B2 | 1/2013 | Togita et al. | |
| 8,451,891 B2 | 5/2013 | Seok et al. | |
| 8,611,416 B2 | 12/2013 | Hwang et al. | |
| 8,787,445 B2 | 7/2014 | Pore et al. | |
| 8,848,801 B2 | 9/2014 | Lainema et al. | |
| 8,867,613 B2 | 10/2014 | Joshi | |
| 8,891,619 B2 | 11/2014 | Leontaris et al. | |
| 8,897,365 B2 | 11/2014 | Reddy et al. | |
| 9,071,822 B2 | 6/2015 | Raveendran et al. | |
| 9,241,159 B2 | 1/2016 | Nakayama | |
| 9,445,110 B2 | 9/2016 | Leontaris et al. | |
| 9,473,792 B2 | 10/2016 | Srinivasamurthy et al. | |
| 9,479,786 B2 | 10/2016 | Lu et al. | |
| 9,538,190 B2 | 1/2017 | Karczewicz et al. | |
| 9,565,440 B2 | 2/2017 | Li et al. | |
| 9,571,828 B2 | 2/2017 | Okawa et al. | |
| 9,628,816 B2 | 4/2017 | Ugur et al. | |
| 9,661,329 B2 | 5/2017 | Zhang et al. | |
| 2001/0017942 A1* | 8/2001 | Kalevo | H04N 19/593 382/238 |
| 2002/0009146 A1 | 1/2002 | Hall et al. | |
| 2004/0146103 A1* | 7/2004 | Chang | H04N 19/107 375/240.03 |
| 2006/0126728 A1 | 6/2006 | Yu et al. | |
| 2006/0133481 A1* | 6/2006 | Chujoh | H04N 19/176 375/240.03 |
| 2006/0165170 A1* | 7/2006 | Kim | H04N 19/176 375/240.12 |
| 2006/0280242 A1 | 12/2006 | Ugur | |
| 2008/0031518 A1 | 2/2008 | Song et al. | |
| 2009/0046778 A1 | 2/2009 | Lee et al. | |
| 2011/0129162 A1 | 6/2011 | Kim et al. | |
| 2012/0026394 A1 | 2/2012 | Maruyama | |
| 2012/0082243 A1* | 4/2012 | Baylon | H04N 19/619 375/240.26 |
| 2012/0314764 A1 | 12/2012 | Tidemann et al. | |
| 2013/0170545 A1 | 7/2013 | Okawa et al. | |
| 2014/0169480 A1 | 6/2014 | Lachine et al. | |
| 2014/0301460 A1 | 10/2014 | Karczewicz et al. | |
| 2014/0376621 A1 | 12/2014 | Fukushima et al. | |
| 2015/0237346 A1 | 8/2015 | Symes et al. | |
| 2016/0301933 A1 | 10/2016 | Jacobson | |
| 2016/0301939 A1 | 10/2016 | Thirumalai | |
| 2016/0309149 A1 | 10/2016 | Thirumalai et al. | |

FOREIGN PATENT DOCUMENTS

| | | |
|---|---|---|
| JP | H05227525 A | 9/1993 |
| JP | H06245199 A | 9/1994 |
| JP | 2009177353 A | 8/2009 |
| JP | 2013138361 A | 7/2013 |
| WO | WO-199716029 A1 | 5/1997 |

OTHER PUBLICATIONS

International Search Report and Written Opinion—PCT/US2016/024010—ISA/EPO—dated May 19, 2016.

VESA (Video Electronics Standards Association) "Display Stream Compression (DSC) Standard v1.1", VESA Standard, VESA, Us, vol. V1.1, Aug. 1, 2014 (Aug. 1, 2014), pp. 1-125, XP008177954, Retrieved from the Internet: URL: http://www.vesa.org/vesa-standards/standards-summaries.

Mohsenian N., et al., "Single-Pass Constant and Variable-Bit-Rate MPEG-2 Video Compression", IBM Journal of Research and Development, International Business Machines Corporation, New York, NY, US, vol. 43, No. 4, Jul. 1, 1999 (Jul. 1, 1999), pp. 489-509, XP002216512, ISSN: 0018-8646.

Vetro A., et al., "Object-based Transcoding for Scalable Quality of Service," Circuits and Systems, 2000, Proceedings. ISCAS 2000 Geneva, The 2000 IEEE International Symposium on May 28-31, 2000, Piscataway, NJ, USA,IEEE, May 28, 2000 (May 28, 2000), vol. 4, pp. 17-20, XP010503526, DOI: 10.1109/ISCAS.2000.858677 ISBN: 978-0-7803-5482-1.

Walls F., et al., "BDC-1: A Robust Algorithm for Display Stream Compression", 2013 Picture Coding Symposium (PCS), IEEE, Dec. 8, 2013 (Dec. 8, 2013), pp. 434-437, XP032567035, DOI: 10.1109/PCS.2013.6737776 [retrieved on Feb. 11, 2014].

Walls F., et al., "VESA Display Stream Compression", Mar. 3, 2014 (Mar. 3, 2014), pp. 1-5, XP002751573, Retrieved from the Internet: URL: "http://www.vesa.org/wp-content/uploads/2014/04/VESA_DSC-ETP200.pdf", on-Nov. 27, 2015].

International Preliminary Report on Patentability from International Application No. PCT/US20116/024010, dated Oct. 17, 2017, 6 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

* cited by examiner

RATE-CONSTRAINED FALLBACK MODE FOR DISPLAY STREAM COMPRESSION

INCORPORATION BY REFERENCE TO PRIORITY APPLICATION(S)

This application claims the benefit of U.S. Provisional Application No. 62/146,911, filed Apr. 13, 2015.

TECHNICAL FIELD

This disclosure relates to the field of video coding and compression, and particularly, to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, there is provided a method for coding video information relating to a slice of an image, wherein the slice includes one or more blocks. The method may involve identifying one or more prediction modes for a fixed-rate codec, wherein each prediction mode has associated with it a rate-distortion cost. The method may involve selecting, for a current block, a prediction mode that has the lowest rate-distortion cost from among the one more prediction modes not previously selected. The method may involve determining whether the selected prediction mode would result in overflow or underflow of a buffer of the fixed-rate codec. The method may involve determining whether the selected prediction mode would result in remaining bits in the slice being insufficient to code remaining blocks of the slice. The method may involve utilizing a fallback mode to code the current block in response to each of the selected one or more prediction modes resulting in at least one of (i) overflow or underflow of the buffer and (ii) insufficient remaining bits in the slice to code the remaining blocks of the slice. In related aspects, the fallback mode may involve determining a midpoint value of the current block and predicting current block samples from the midpoint value.

In another aspect, there is provided a device that may include a memory configured to store video information relating to a slice of an image, wherein the slice includes one or more blocks. The device may include at least one processor circuit coupled to the memory and configured to: identify one or more prediction modes for a fixed-rate codec, each prediction mode having a rate-distortion cost; select, for a current block, a prediction mode that has the lowest rate-distortion cost from among the one more prediction modes not previously selected; determine whether the selected prediction mode would result in overflow or underflow of a buffer of the fixed-rate codec; determine whether the selected prediction mode would result in remaining bits in the slice being insufficient to code remaining blocks of the slice; and utilize a fallback mode to code the current block in response to each of the selected one or more prediction modes resulting in at least one of (i) overflow or underflow of the buffer and (ii) insufficient remaining bits in the slice to code the remaining blocks of the slice, wherein the fallback mode may include determining a midpoint value of the current block and predicting current block samples from the midpoint value.

DETAILED DESCRIPTION

Figure 1A:
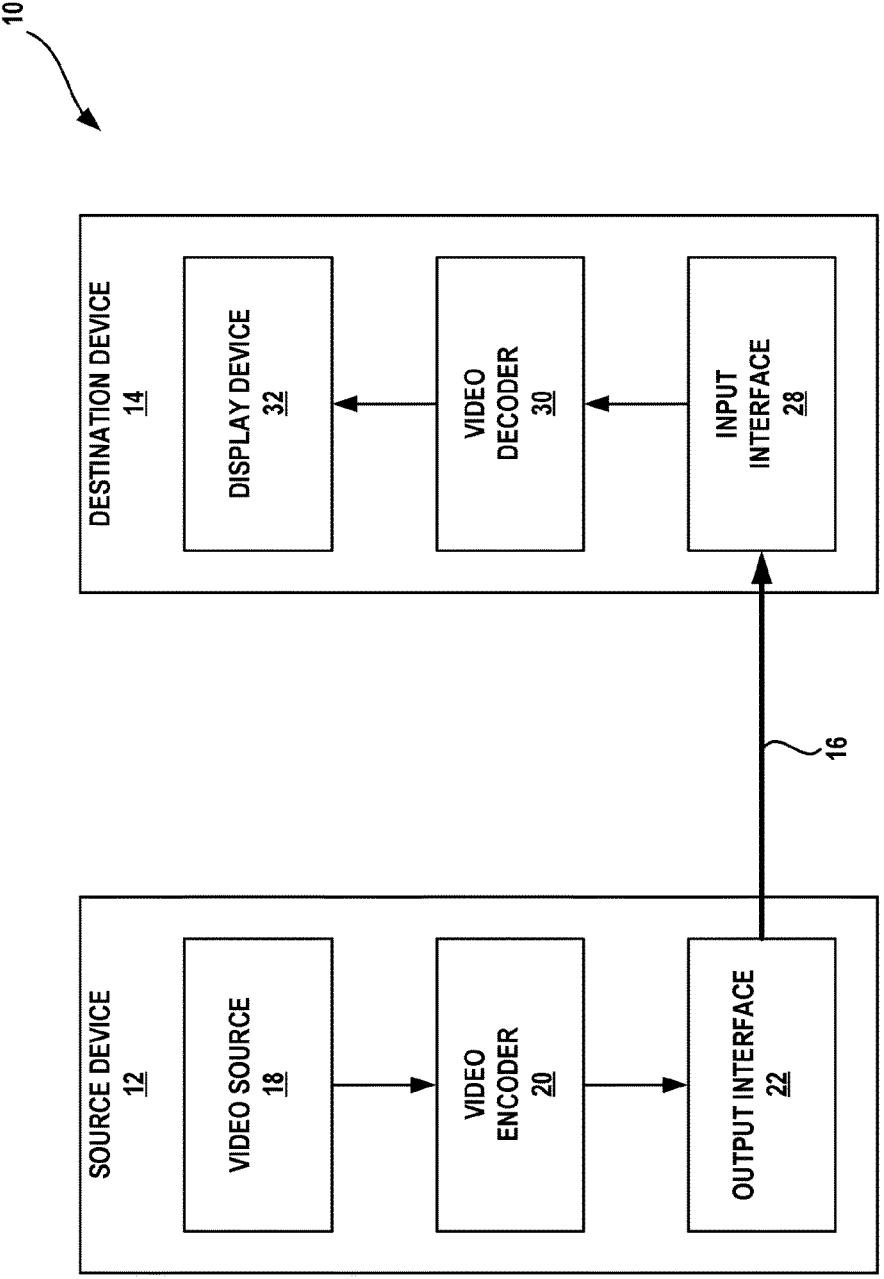
FIG. 1A is a block diagram illustrating an example video encoding and decoding system that may utilize techniques in accordance with aspects described in this disclosure.

In general, the present disclosure relates to techniques of improving video compression techniques such as display stream compression (DSC). More specifically, this disclosure relates to systems and methods for detecting a transition from a flat or smooth region to a complex region of an image to be coded. Described herein are techniques for complex region detection in video data in the context of video compression techniques, such as, for example, DSC. Aspects of this disclosure relate to ensuring that underflow or overflow of the rate buffer during coding is avoided.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. The techniques described herein may be particularly applicable to standards which incorporate a constant bit rate (CBR) buffer model. Also, the techniques described in this disclosure may become part of standards developed in the future. In other words, the techniques described in this disclosure may be applicable to previously developed video coding standards, video coding standards currently under development, and forthcoming video coding standards.

The concepts of this disclosure may be integrated in or a be part of a codec (e.g., DSC) that includes several elements and/or modes aimed at encoding/decoding various types of content with substantially visually lossless performance. This disclosure provides a complex region detection algorithm that detects the transition from a smooth/flat region (e.g., a region that is easy to code) to a complex region (e.g., a region that is relatively difficult to code or requires a higher number of bits to code). When such a transition is detected, the quantization parameter (QP) used in the codec is increased to a high value in order to reduce the expected rate required to code the current block. This is desirable as the complexity of visual information in the complex region may mask artifacts more so than would occur for a smooth/flat region. In addition, the low rate is desirable to prevent the coder from spending too many bits on a complex block (e.g., well in excess of the target bit rate).

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
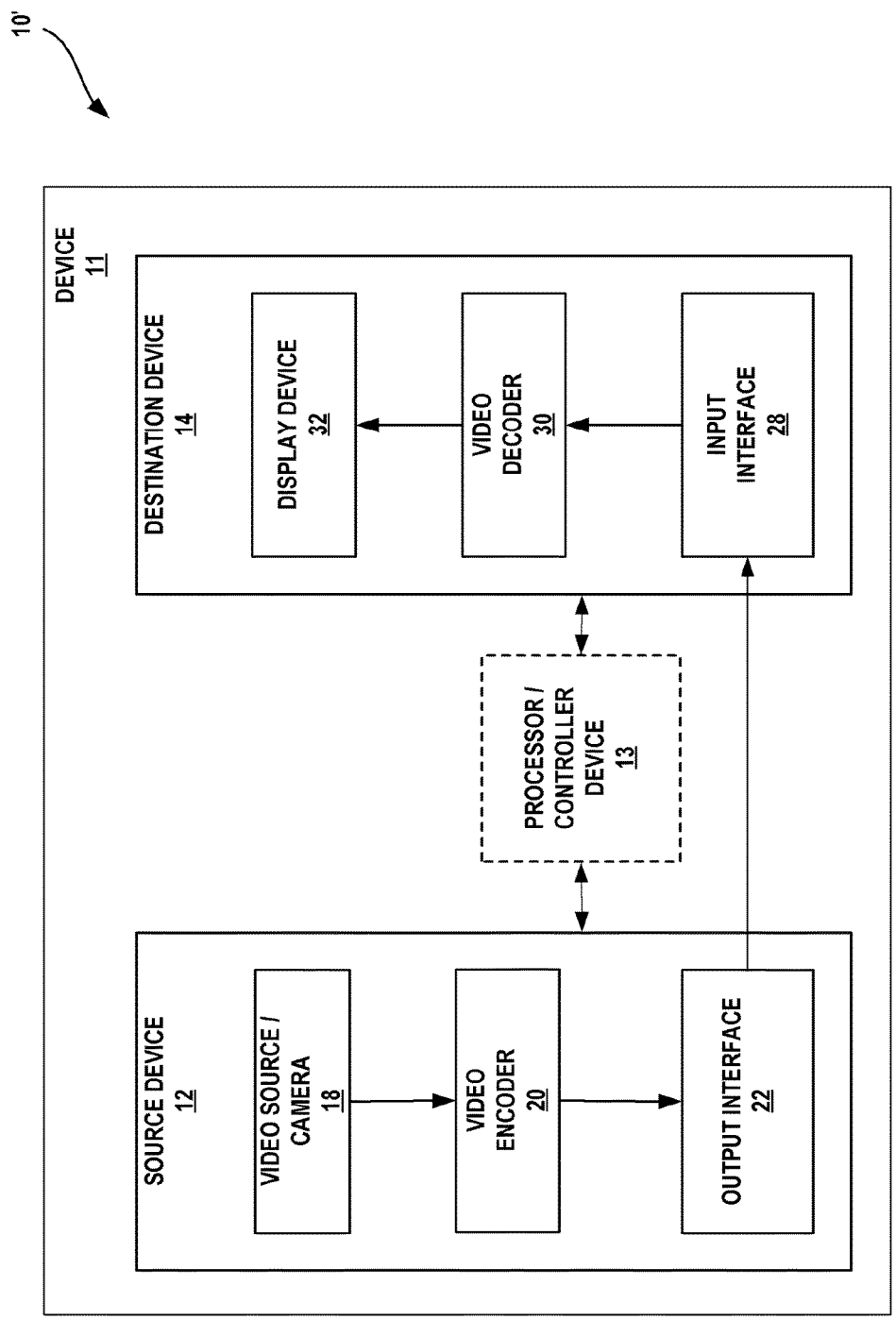
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a QP. To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
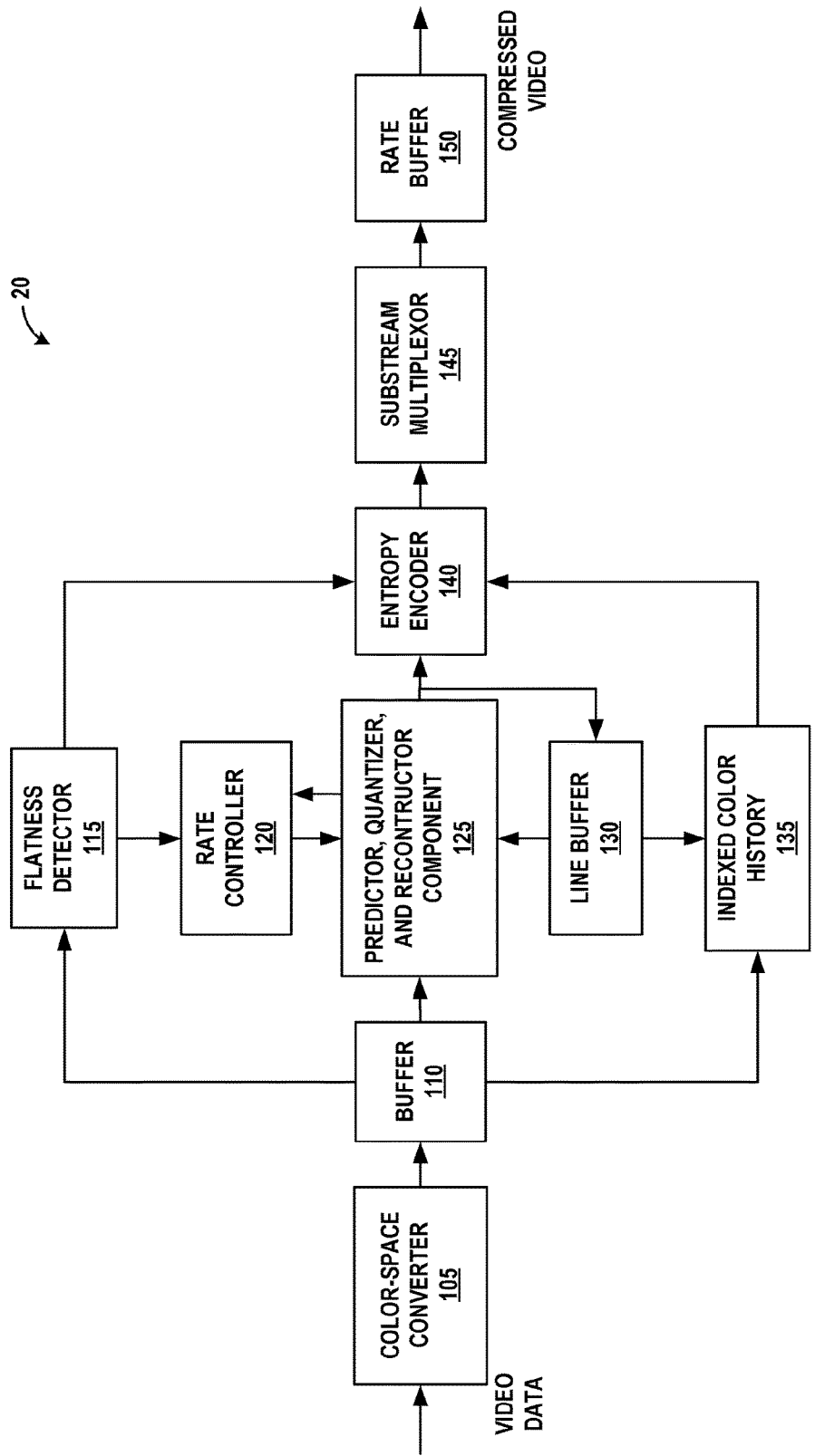
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space converter 105 may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCoCg) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a CBR buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

$$BF=((BufferCurrentSize*100)/BufferMaxSize)$$

It is noted that the above approach to calculating BF is merely exemplary, and that the BF may be calculated in any number of different ways, depending on the particular implementation or context.

The flatness detector 115 can detect changes from complex (i.e., non-flat) areas in the video data to flat (i.e., simple or uniform) areas in the video data, and/or vice versa. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions from complex to flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified. Similarly, transitions from flat to complex regions may be used by the video encoder 20 to increase the QP in order to reduce the expected rate required to code a current block.

The rate controller 120 determines a set of coding parameters, e.g., a QP. The QP may be adjusted by the rate controller 120 based on the buffer fullness of the rate buffer 150 and image activity of the video data (e.g., a transition from complex to flat regions or vice versa) in order to maximize picture quality for a target bit rate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate. Thus, one purpose of the rate controller 120 is to determine a set of coding parameters, such as QP(s), coding mode(s), etc., to satisfy instantaneous and average constraints on rate while maximizing rate-distortion performance.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
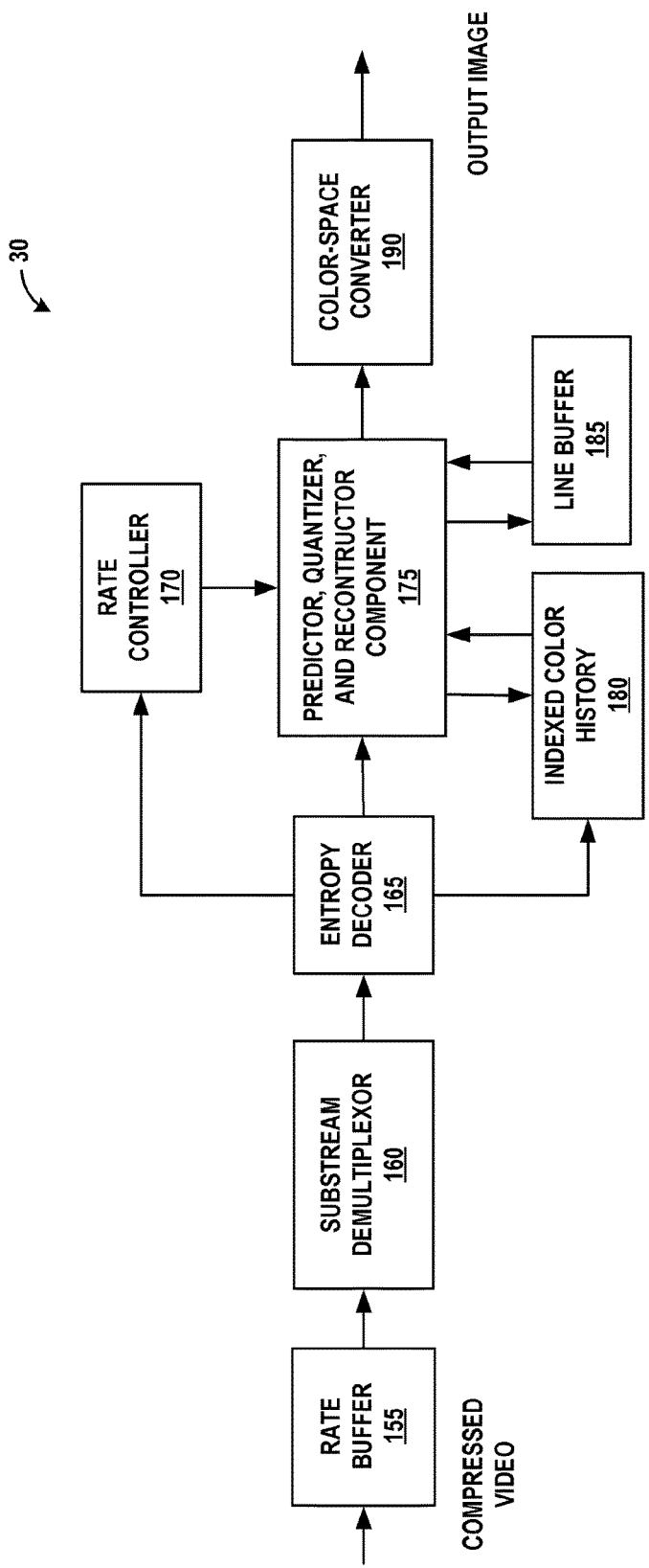
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

QP Calculation

In one approach, the QP for the current block (denoted as currQP) may be derived or calculated based on the following equation:

curr*QP*=prev*Q*+*Qp*Adj*(diffBits>0?1:−1), where prevQP is the QP associated with the previous block, diffBits represents the difference between the previousBlockBits and targetBits, QpAdj is the QP offset value (e.g., QP adjustment value) that is calculated based on the magnitude of diffBits, previousBlockBits represents the number of bits used to code the previous block, and targetBits represents a target number of bits in which to code the current block. When previousBlockBits>targetBits, diffBits is positive, and the current block QP may be derived by adding the offset value QpAdj to the prevQP value. In other words, the QP value does not decrease in value from the prevQP value when diffBits is positive. When previousBlockBits≤targetBits, diffBits is negative or zero, and currQP does not increase from the prevQP value. It is noted that the offset value QpAdj may be calculated, for example, as a function of diffBits in such a way that QpAdj monotonically increases as the magnitude of diffBits increases.

Figure 3:
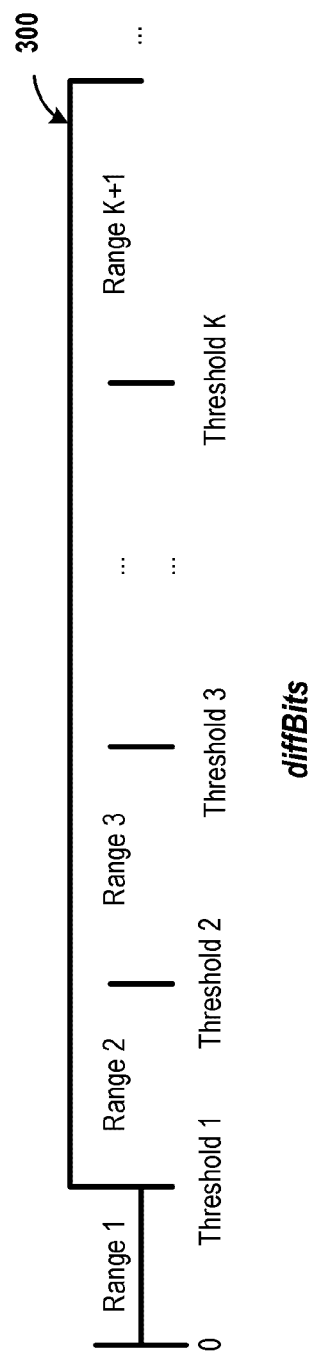
FIG. 3 shows an example approach to determining quantization parameter (QP) adjustment value(s).

One technique, referred to herein as a default technique, for calculating the QP adjustment value QpAdj will now be described with reference to FIG. 3. FIG. 3 provides a graph 300 including an axis on which values of diffBits starting a zero are plotted. In the default technique, when diffBits>0, diffBits may be classified into K+1 ranges using K threshold values. These threshold values are illustrated by the labels Threshold 1, Threshold 2, Threshold 3, . . . , and Threshold K and the ranges are illustrated by the labels Range 1, Range 2, Range 3, . . . , and Range K+1. In the default technique of FIG. 3, there is shown one approach to segmenting diffBits into K+1 ranges using K threshold values. Each range may be associated with a specific QpAdj value, where the QpAdj value increases as the range index increases. When diffBits≤0, the absolute value of diffBits may be classified into J+1 ranges using J threshold values (not illustrated), and there may be a specific QpAdj value assigned for each of the J+1 ranges.

In other aspects, the currQP value may be adjusted based on the fullness of the buffer (which may be represented in terms of buffer fullness BF), in order to prevent underflow and/or overflow of the buffer. In particular, when BF exceeds a certain threshold (e.g., $P_1$), currQP may be incremented by a fixed offset value (e.g., $p_1$). For example, currQP may be adjusted as follows: currQP+=$p_1$. Further, when BF falls below a certain threshold (e.g., $Q_1$), currQP may be decremented by $q_1$, e.g., currQP−=$q_1$. In certain aspect, a plurality of thresholds may be employed, and for each threshold there may be a corresponding offset value to adjust currQP.

When a transition from a complex region to a flat region is identified or when a flat region is identified, the currQP may be set to a low value (e.g., a value below a defined currQP value), as described in further detail below.

Fallback Prediction Mode for Coding Image Regions

In accordance with one or more aspects of the present disclosure, there is provided a fallback mode for a block-based codec having a multitude of prediction/coding modes, each aimed at coding a content type. In one implementation, a rate control mechanism may be utilized to select among the prediction modes for each block in an image via considering both the rate and the distortion of each prediction mode.

For example, a rate-distortion cost may be calculated for each of the prediction modes, and the respective rate-distortion costs may be considered when considering the available prediction modes. The rate-control mechanism may be supported by, for example, a hypothetical reference decoder (HRD) buffer model, and it may be a design requirement of the codec that the buffer is never in a state of underflow (e.g., fewer than zero bits in the buffer) or overflow (e.g. buffer size has increased past a set maximum size). Such a technique is applicable to any codec that utilizes a rate buffer where the buffer underflow/overflow should be prevented, which is typical for fixed-rate codecs (e.g., DSC).

Figure 4:
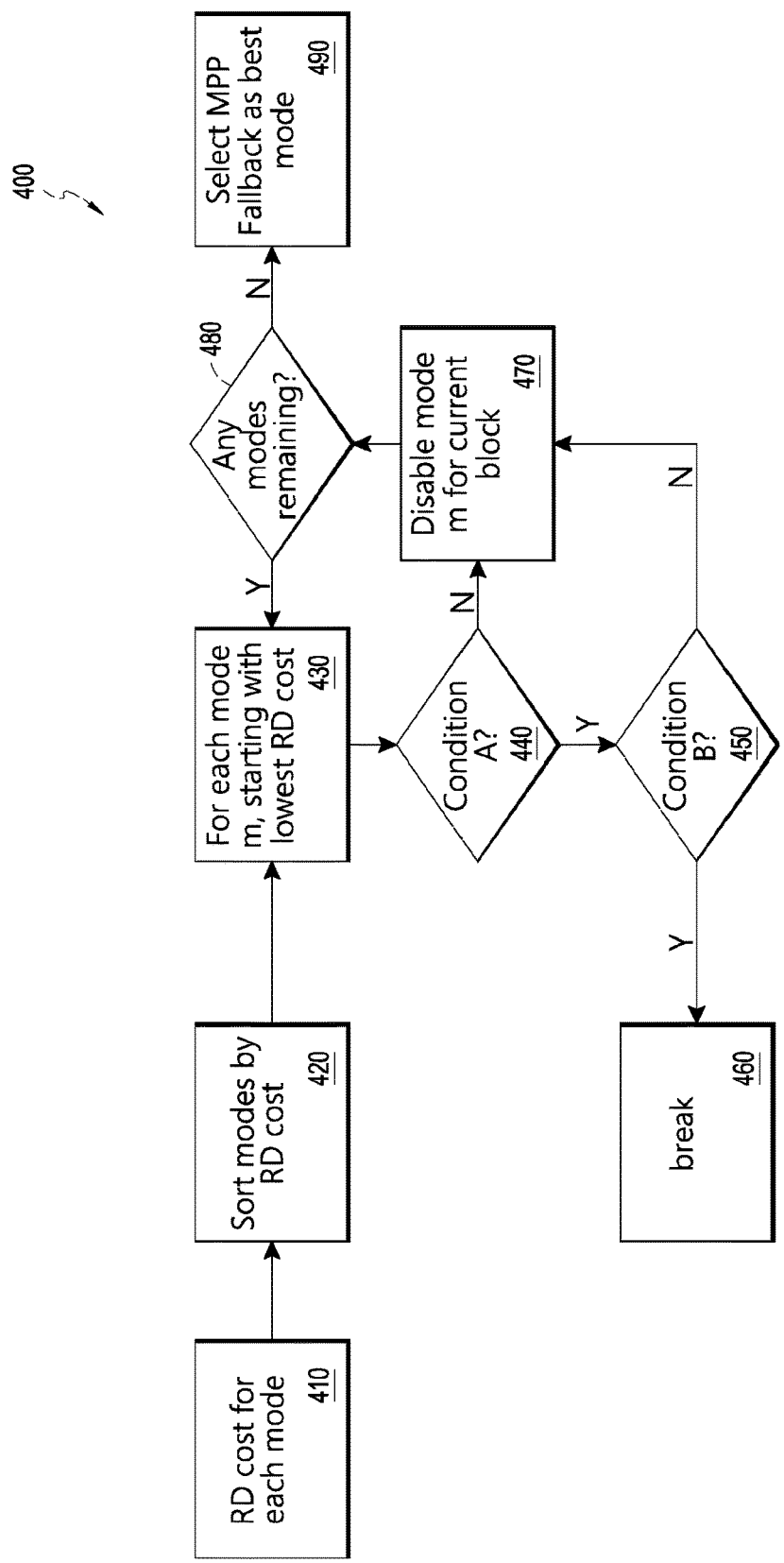
FIG. 4 is a flowchart illustrating an example method for coding a current block of a slice based on rate-distortion criteria for a fixed-rate codec, in accordance with aspects described in this disclosure.

With reference to FIG. 4, there is shown a flowchart for an example method 400 that involves selecting a prediction mode for coding a current block of a slice based on rate-distortion criteria. At block 410, the method 400 may involve calculating a rate-distortion cost for each prediction mode. For example, the rate-distortion cost may be calculated according to the following equation: $C_{mode}=D_{mode}+\lambda R_{mode}$.

$D_{mode}$ denotes distortion for a prediction mode. In one example $D_{mode}$ may be calculated as a sum of absolute differences (or as a weighted sum of absolute differences) for YCoCg or another color-space. It is noted, however, that other distortion metrics may be used in addition to or in lieu of such metrics based on the sum of absolute differences or the weighted sum of absolute differences. $R_{mode}$ denotes bit rate for the prediction mode. $\lambda$ denotes a Lagrangian parameter. The Lagrangian parameter may be a function of bit rate and buffer fullness.

At block 420, the method 400 may involve sorting or ranking the prediction modes based on their respective rate-distortion costs. Starting at block 430, the method 400 may involve selecting the prediction mode m with the smallest rate-distortion cost among the available prediction modes (not previously selected) to determine if the selected mode satisfies certain conditions/criteria. In the example of FIG. 4, the conditions/criteria are Condition A (at block 440) and Condition B (at block 450).

Condition A at decision block 440 is whether the selection of the prediction mode m ensures that the buffer does not end up in a state of overflow and/or underflow for the fixed-rate codec. Condition B at decision block 450 is whether the selection of the prediction mode m results in sufficient remaining bits in the slice to code the remaining blocks of the slice.

If Condition A at decision block 440 is satisfied (i.e., that the selection of the prediction mode m ensures that the buffer does not end up in a state of overflow and/or underflow for the fixed-rate codec), then the method 400 may advance to decision block 450 to determine whether Condition B is met (i.e., that the selection of the prediction mode m results in sufficient remaining bits in the slice to code the remaining blocks of the slice). If Condition B is met, then the method 400 may advance to block 460 to break or end.

If either Condition A at decision block 440 or Condition B at decision block 450 is not satisfied, then the method 400 may advance to block 470, where the prediction mode m is disabled for the current block, and then advance to decision block 480, where the method may determine if there are remaining prediction modes remaining for the current block.

If it is determined at decision block 480 that that there are more prediction modes remaining for the current block, then the method 400 may return to block 430 to select the next prediction mode having the smallest rate-distortion cost among the remaining prediction modes. This selected prediction mode is then tested to determine whether or not this selected prediction mode satisfies Conditions A and B.

If it is determined at decision block 480 that that there are no more prediction modes remaining for the current block, then the method 400 may advance to block 490 where a Midpoint Prediction (MPP) Fallback mode is selected. MPP Fallback mode may be abbreviated as MPPF mode.

With the MPPF mode, each sample in a block may be predicted from a pre-defined midpoint value. This midpoint value may be computed in several different ways, as explained in further detail below. In related aspects, the midpoint value for the current block can either be fixed, or may depend on neighboring pixel values (e.g., may be calculated based at least in part on the neighboring pixel values). For example, calculating the midpoint value may involve calculating the midpoint value based on a mean of pixel values neighboring the current block.

In one aspect, calculating the midpoint value may involve defaulting to half of a dynamic range of a color-space component of the current block in response to the current block being the first block in the slice. In one example, for RGB888 content, the midpoint may be 1<<(8−1)=128. In another example, for YCoCg content with 9 bits per chroma component, the midpoint may be equal to 256. Here, the midpoint value may default to 256 if chroma is in range [0, 511] or may default to 0 if chroma is in the range [−256, 255].

In another aspect, the selection or calculation of the midpoint may be based in part on whether the current block is within the first line of a slice (FLS) or not within the first line in a slice (NFLS). For example, if the current block is within a FLS, but not the first block in the slice, then the previous reconstructed block from the current line may be used to compute the midpoint. In another example, if the current block within a NFLS, then the previous reconstructed line may be used to compute the midpoint.

As such, calculating the midpoint value may involve computing the midpoint value based on at least one of a previous reconstructed block and a previous reconstructed line. For example, computing the midpoint value may be based on the previous reconstructed block in response to the current block being within a first line of a slice. In another example, computing the midpoint value may be based on the previous reconstructed line in response to the current block not being within a first line of a slice.

In yet another aspect, the midpoint may be calculated based on a dynamic range of a current sample of the current block and/or a step size of a quantizer of the fallback mode. In one implementation, the midpoint may be computed according to the following equations:

$$MP = \text{Clip}\left(\frac{DR}{2} \cdot \frac{DR}{2} + 2 \cdot \text{offset} - 1, x + \text{offset}\right)$$

$$\text{offset} = 1 << (stepSize - 1)$$

DR denotes the dynamic range of the current sample, and stepSize denotes the current step size of the quantizer. The value x may be based on either the previous reconstructed block or previous reconstructed line depending on, for example, whether the current block is in a FLS or NFLS.

For example, x may be calculated as the mean of the previous reconstructed block. In this scenario, a simple power-of-2 quantizer may be used, such that the step size determines the number of bitplanes to truncate. This midpoint will be in the following range:

$$MP \in \left[\frac{DR}{2}, \frac{DR}{2} + (1 << stepSize) - 1\right]$$

The above range is biased towards positive values because the quantized residual will have one additional code in the negative region than in the positive region, due to the extra code in 2's complement arithmetic. Example codewords for 2-bit 2's complement values are provided in the table below. It is noted that this range [−2,1] has one additional negative code.

| Code | 2's complement |
|------|----------------|
| 00   | 0              |
| 01   | +1             |
| 10   | −2             |
| 11   | −1             |

In another implementation, the offset may be omitted. That is, each sample may be predicted from half the dynamic range only. In yet another implementation, a dynamic approach may be utilized in which the encoder decides per-block whether to add an offset to the midpoint prediction or not. Such information may be signaled, for example, by transmitting one bit to the decoder.

In still another implementation, a dynamic approach may be utilized which is implicit rather than explicit. That is, the encoder and decoder can both make a decision whether to add an offset to the midpoint based on data from the previous reconstructed block or the previous reconstructed line.

In another implementation, the neighbors used for computing the midpoint may be from the previous reconstructed block (same line), rather than the previous reconstructed line. In yet another implementation, the midpoint (MP) value may be calculated based on the following equation, wherein % denotes the modulo of x with respect to (1<<stepSize):

$$MP = \left(\frac{DR}{2}\right) + (x \% (1 << stepSize))$$

In still another implementation, the midpoint value may be computed as a mean of the neighboring pixel values, but not clipped by computing the modulus of the current bit depth.

Once the midpoint values have been computed for the current block, the current block samples may be predicted from the midpoint value, and the residual may be quantized and signaled to the decoder. It is noted that midpoint value computed for the current block will be identical between encoder and decoder.

Since the MPPF mode may be intended for use in random noise regions, where no spatial correlation is available, and the rate is highly-constrained, the quantized residuals may be coded using a fixed number of bits per sample. This also has the effect of ensuring a worst-case behavior for MPPF mode.

In one aspect, the quantized residuals may be grouped and entropy coded, or coded using an alternate variable-length code, such as, for example, Exponential Golomb, Huffman table, etc.

In another aspect, the current block may be partitioned into a set of sub-blocks. For example, a 2×8 block may be partitioned into four 1×4 sub-blocks. A separate midpoint value may be calculated for each sub-block. Each sample in the current block may be predicted from the midpoint with which it intersects. For example, given a sub-block size of 1×4, the first four pixels in the current block may be predicted from the same midpoint value (e.g., $MP_0$). The next four samples will may be predicted from $MP_1$, etc.

In yet another aspect, the number of bits per sample for the MPPF mode may be selected based in part on the desired application. In one suggested approach, the total number of bits for an MPPF block may be less than the target bit rate of the encoder. For example, if the source content is RGB888 (24 bits/pixel), the block size is 2×8, and the compression rate is 4:1, the target bit rate may be calculated according to the following equation:

$$(16 px) \cdot \left(\frac{24 bpp}{4}\right) = 96 \text{ bits}.$$

In the above example, the total rate for an MPPF block should be strictly less than 96 bits. In a variation of the above example, a less than or equal to (≤) notation may be used in lieu of the less than (<) notation, such that each MPPF block should be less than or equal to 96 bits.

It is noted that the proposed MPPF mode can be tuned to have a worst-case rate per block. This is desirable as the codec can ensure ahead of time that a given number of bits are substantially available for any block within the current slice. In one example, the only requirement may be that the MPPF mode rate is less than the target compressed bit rate in order to prevent buffer overflow.

It is further noted that the proposed fallback mode is well-suited for encoding random noise regions, which may have maximum entropy. Since spatial correlation may be zero for such cases, prediction may not provide any rate savings. Therefore, simply predicting from the mean of the random distribution may be optimal. For example, all residuals may be uniformly distributed between $[-2^{N-1}, 2^{N-1}-1]$, for a bit depth of N. For noise which is not uniform over $[0, 2^N-1]$, the prediction portion of MPPF mode may further involve reducing the expected rate.

Example Flowchart for Rate-Constrained Fallback Mode

Figure 5:
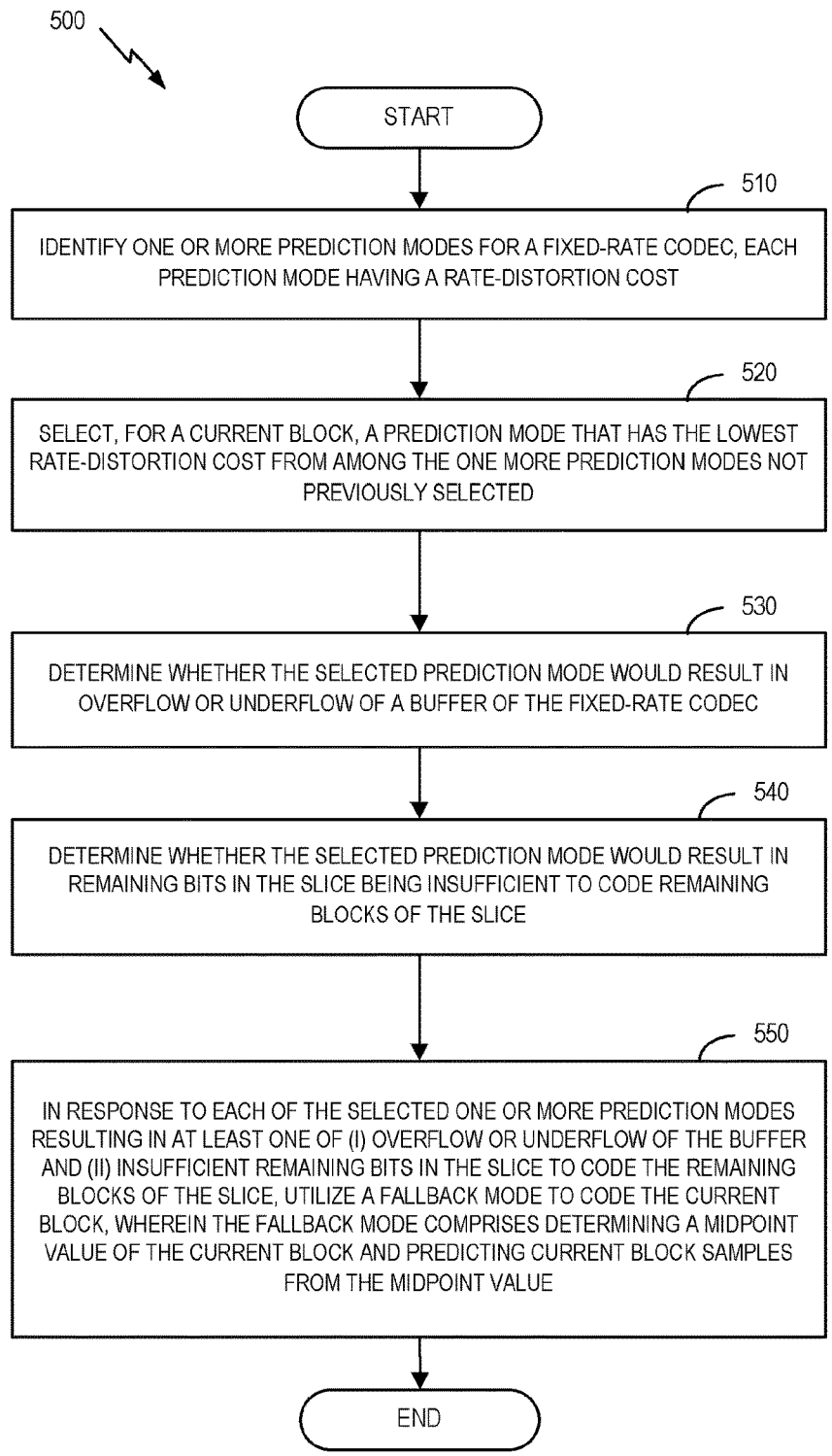
FIG. 5 is a flowchart illustrating an example method for coding video information, in accordance with aspects described in this disclosure.

With reference to FIG. 5, an example procedure for coding video information will be described. The video information may include a slice of an image, and the slice may include one or more blocks.

FIG. 5 is a flowchart illustrating a method 500 for coding video information, according to an embodiment of the present disclosure. The steps illustrated in FIG. 5 may be performed by a video encoder (e.g., the video encoder 20 in FIG. 2A), a video decoder (e.g., the video decoder 30 in FIG. 2B), or component(s) thereof, such as for example, the rate controller 120, the predictor, quantizer, and reconstructor component 125, the entropy encoder 140, and the rate buffer 150. For convenience, method 500 is described as performed by a video coder (also simply referred to as coder), which may be the video encoder 20, the video decoder 30, or another component.

The coder or component(s) thereof may be implemented on device that includes an integrated global memory shared by a plurality of programmable compute units that includes a buffer, wherein the buffer may include a first-in-first-out (FIFO) buffer. The device may further include an integrated circuit (IC) comprising that includes a graphics processing unit (GPU), wherein the GPU may include one or more programmable compute units.

The method 500 begins at block 510. At block 510, the coder identifies one or more prediction modes for a fixed rate codec, each prediction mode having a rate-distortion cost. The one or more prediction modes may include, for example, one or more of a DCT mode, a block prediction mode, and a pattern prediction mode. At block 520, the coder selects, for a current block, a prediction mode that has the lowest rate-distortion cost from among the one more prediction modes not previously selected.

At block 530, the coder determines whether the selected prediction mode would result in overflow or underflow of a buffer of the fixed rate codec. At block 540, the coder determines whether the selected prediction mode would result in remaining bits in the slice being insufficient to code remaining blocks of the slice.

At block 550, in response to each of the selected one or more prediction modes resulting in at least one of (i) overflow or underflow of the buffer and (ii) insufficient remaining bits in the slice to code the remaining blocks of the slice, the coder utilizes a fallback mode to code the current block. The fallback mode may involve determining a midpoint value of the current block and predicting current block samples from the midpoint value.

In one example, block 550 may involve the coder determining the midpoint value by defaulting to half of a dynamic range of a color-space component of the current block in response to the current block being the first block in the slice. In another example, block 550 may involve the coder determining the midpoint value based on a mean of pixel values neighboring the current block.

In yet another example, block 550 may involve the coder determining the midpoint value based on at least one of a previous reconstructed block and a previous reconstructed line. For example, the coder may calculate or compute the midpoint value based on the previous reconstructed block in response to the current block being within a first line of a slice. In another example, the coder may calculate or compute the midpoint value based on the previous reconstructed line in response to the current block not being within a first line of a slice.

In still another example, the coder may determine the midpoint based on a dynamic range of a current sample of the current block and a step size of a quantizer of the fallback mode.

Other Considerations

It should be noted that aspects of this disclosure have been described from the perspective of an encoder, such as the video encoder 20 in FIG. 2A. However, those skilled in the art will appreciate that the reverse operations to those described above may be applied to decode the generated bitstream by, for example, the video decoder 30 in FIG. 2B.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for coding video information relating to a slice of an image, the slice comprising one or more blocks, the method comprising:
   sorting a plurality of prediction modes for a fixed-rate codec based on a respective rate-distortion cost of each prediction mode of the plurality of prediction modes;
   for each prediction mode of the plurality of prediction modes:
      determining, for a current block of the one or more blocks, based on the sorting, the respective rate-distortion cost for a respective prediction mode is less than the rate-distortion cost of other prediction modes among the plurality of prediction modes not previously determined to result in at least one of (i) overflow or underflow of a buffer of the fixed-rate codec or (ii) insufficient remaining bits in the slice to code remaining blocks of the slice; and
      determining the respective prediction mode would result in at least one of (i) overflow or underflow of the buffer of the fixed-rate codec or (ii) insufficient remaining bits in the slice to code remaining blocks of the slice; and
   coding the current block utilizing a fallback mode in response to determining each prediction mode of the plurality of prediction modes would result in at least one of (i) overflow or underflow of the buffer or (ii) insufficient remaining bits in the slice to code the remaining blocks of the slice, wherein the fallback mode comprises determining a midpoint value of the current block and predicting samples for the current block from the midpoint value.

2. The method of claim 1, wherein determining the midpoint value comprises defaulting to half of a dynamic range of a color-space component of the current block in response to the current block being the first block in the slice.

3. The method of claim 1, wherein the determining of the midpoint value is based on a mean of reconstructed pixel values neighboring the current block.

4. The method of claim 1, wherein the determining of the midpoint value is based on at least one of a previous reconstructed block and a previous reconstructed line.

5. The method of claim 4, wherein the determining of the midpoint value is further based on the previous reconstructed block in response to the current block being within a first line of a slice.

6. The method of claim 4, wherein the determining of the midpoint value is further based on the previous reconstructed line in response to the current block not being within a first line of a slice.

7. The method of claim 1, wherein the determining of the midpoint value is based on a dynamic range of a current sample of the current block and a step size of a quantizer of the fallback mode.

8. The method of claim 1, wherein the plurality of prediction modes comprise one or more of a discrete cosine transform (DCT) mode, a block prediction mode, and a pattern prediction mode.

9. A device, comprising:
a memory configured to store video information relating to a slice of an image, the slice comprising one or more blocks; and
at least one processor circuit coupled to the memory and configured to:
sort a plurality of prediction modes for a fixed-rate codec based on a respective rate-distortion cost of each prediction mode of the plurality of prediction modes;
for each prediction mode of the plurality of prediction modes:
determine, for a current block of the one or more blocks, based on the sorting, the respective rate-distortion cost for a respective prediction mode is less than the rate-distortion cost of other prediction modes among the plurality of prediction modes not previously determined to result in at least one of (i) overflow or underflow of a buffer of the fixed-rate codec or (ii) insufficient remaining bits in the slice to code remaining blocks of the slice; and
determine the respective prediction mode would result in at least one of (i) overflow or underflow of the buffer of the fixed-rate codec or (ii) insufficient remaining bits in the slice to code remaining blocks of the slice; and
code the current block utilizing a fallback mode in response to determining each prediction mode of the plurality of prediction modes would result in in at least one of (i) overflow or underflow of the buffer or (ii) insufficient remaining bits in the slice to code the remaining blocks of the slice, wherein the fallback mode comprises determining a midpoint value of the current block and predicting samples for the current block from the midpoint value.

10. The device of claim 9, wherein the at least one processor is further configured to determine the midpoint value via defaulting to half of a dynamic range of a color-space component of the current block in response to the current block being the first block in the slice.

11. The device of claim 9, wherein the at least one processor is further configured to determine the midpoint value based on a mean of reconstructed pixel values neighboring the current block.

12. The device of claim 9, wherein the at least one processor is further configured to determine the midpoint value based on at least one of a previous reconstructed block and a previous reconstructed line.

13. The device of claim 12, wherein the at least one processor is further configured to determine the midpoint value based on the previous reconstructed block in response to the current block being within a first line of a slice.

14. The device of claim 12, wherein the at least one processor is further configured to determine the midpoint value based on the previous reconstructed line in response to the current block not being within a first line of a slice.

15. The device of claim 9, wherein the at least one processor further is configured to determine the midpoint value based on a dynamic range of a current sample of the current block and a step size of a quantizer of the fallback mode.

16. The device of claim 9, wherein the plurality of prediction modes comprise one or more of a discrete cosine transform (DCT) mode, a block prediction mode, and a pattern prediction mode.

17. An apparatus for coding video information relating to a slice of an image, the slice comprising one or more blocks, the apparatus comprising:
means for sorting a plurality of prediction modes for a fixed-rate codec based on a respective rate-distortion cost of each prediction mode of the plurality of prediction modes;
for each prediction mode of the plurality of prediction modes:
means for determining, for a current block of the one or more blocks, based on the sorting, the respective rate-distortion cost for a respective prediction mode is less than the rate-distortion cost of other prediction modes among the plurality of prediction modes not previously determined to result in at least one of (i) overflow or underflow of a buffer of the fixed-rate codec or (ii) insufficient remaining bits in the slice to code remaining blocks of the slice; and
means for determining the respective prediction mode would result in at least one of (i) overflow or underflow of the buffer of the fixed-rate codec or (ii) insufficient remaining bits in the slice to code remaining blocks of the slice; and
means for coding the current block utilizing a fallback mode in response to determining each prediction mode of the plurality of prediction modes would result in at least one of (i) overflow or underflow of the buffer or (ii) insufficient remaining bits in the slice to code the remaining blocks of the slice, wherein the means for coding the current block utilizing a fallback mode comprises means for determining a midpoint value of the current block and predicting samples for the current block from the midpoint value.

18. The apparatus of claim 17, wherein the means for determining the midpoint value comprises means for defaulting to half of a dynamic range of a color-space component of the current block in response to the current block being the first block in the slice.

19. The apparatus of claim 17, wherein the means for determining comprises means for calculating the midpoint value based on a mean of reconstructed pixel values neighboring the current block.

20. The apparatus of claim 17, wherein the means for determining comprises means for calculating the midpoint value based on at least one of a previous reconstructed block and a previous reconstructed line.

21. The apparatus of claim 20, wherein the means for calculating comprises means for calculating the midpoint value based on the previous reconstructed block in response to the current block being within a first line of a slice.

22. The apparatus of claim 20, wherein the means for calculating comprises means for calculating the midpoint value based on the previous reconstructed line in response to the current block not being within a first line of a slice.

23. The apparatus of claim 17, wherein the means for determining comprises means for calculating the midpoint based on a dynamic range of a current sample of the current block and a step size of a quantizer of the fallback mode.

24. The apparatus of claim 17, wherein the plurality of prediction modes comprise one or more of a discrete cosine transform (DCT) mode, a block prediction mode, and a pattern prediction mode.

25. A non-transitory computer readable storage medium having stored thereon video information relating to a slice of an image, the slice comprising one or more blocks, wherein the storage medium further has stored thereon instructions that, when executed, cause a processor of a device to:
   sort a plurality of prediction modes for a fixed-rate codec based on a respective rate-distortion cost of each prediction mode of the plurality of prediction modes;
   for each prediction mode of the plurality of prediction modes;
   determine, for a current block of the one or more blocks, based on the sorting, the respective rate-distortion cost for a respective prediction mode is less than the rate-distortion cost of other prediction modes among the plurality of prediction modes not previously determined to result in at least one of (i) overflow or underflow of a buffer of the fixed-rate codec or (ii) insufficient remaining bits in the slice to code remaining blocks of the slice; and
   determine the respective prediction mode would result in at least one of (i) overflow or underflow of the buffer of the fixed-rate codec or (ii) insufficient remaining bits in the slice to code remaining blocks of the slice; and
   code the current block utilizing a fallback mode in response to determining each prediction mode of the plurality of prediction modes would result in in at least one of (i) overflow or underflow of the buffer or (ii) insufficient remaining bits in the slice to code the remaining blocks of the slice, wherein the fallback mode comprises determining a midpoint value of the current block and predicting samples for the current block from the midpoint value.

26. The non-transitory computer readable storage medium of claim 25, further having stored thereon instructions that, when executed, cause the processor to determine the midpoint value based on defaulting to half of a dynamic range of a color-space component of the current block in response to the current block being the first block in the slice.

27. The non-transitory computer readable storage medium of claim 25, further having stored thereon instructions that, when executed, cause the processor to determine the midpoint value based on a mean of reconstructed pixel values neighboring the current block.

28. The non-transitory computer readable storage medium of claim 25, further having stored thereon instructions that, when executed, cause the processor to determine the midpoint value based on at least one of a previous reconstructed block and a previous reconstructed line.

29. The non-transitory computer readable storage medium of claim 28, further having stored thereon instructions that, when executed, cause the processor to determine the midpoint value (i) based on the previous reconstructed block in response to the current block being within a first line of a slice or (ii) based on the previous reconstructed line in response to the current block not being within a first line of a slice.

30. The non-transitory computer readable storage medium of claim 25, further having stored thereon instructions that, when executed, cause the processor to determine the midpoint based on a dynamic range of a current sample of the current block and a step size of a quantizer of the fallback mode.

* * * * *